July 5, 1949.   B. KAUFMANN   2,475,244
REINFORCED DENTAL FACING
Filed Dec. 7, 1946

INVENTOR
*Bruno Kaufmann*
BY
*Harry Ernest Rubens*
ATTORNEY

UNITED STATES PATENT OFFICE 2,475,244

REINFORCED DENTAL FACING

Bruno Kaufmann, New York, N. Y.

Application December 7, 1946, Serial No. 714,684

2 Claims. (Cl. 32—9)

My invention relates to dental facings for use on dental crowns and bridgework and more particularly to reinforced plastic facings which are exchangeable, and interchangeable with present types.

Facings hitherto in use for this purpose are unsatisfactory, being unable to withstand, over a long period of time, the usual mastical stresses. Therefore, it is desirable for facings to be redesigned to bring their useful life more into line with the substantial dental foundation upon which it is mounted.

The principal object of my invention, therefore, is to provide a dental facing made of plastic, plastic composition and like material, which is of sturdy construction, and capable of resisting, without damage, the mastical stresses, particularly of the shock type, for prolonged periods.

Other objects are to provide dental facings having the foregoing characteristics which can be manufactured on a mass production basis; which facings are variously colored and shaped to comply with the modern needs of the dental profession with the knowledge that any selected facing can be mounted on the standard fixture for retaining the facing on dental crowns and bridge work; to provide such a facing that is readily interchangeable with present types; to provide the foregoing type of facing that can be made inexpensively, and installed in a minimum amount of time, resulting in a saving both to patient and dentist.

I accomplish these and other objects and obtain my new results as will be apparent from the device described in the following specification, particularly pointed out in the claims, and illustrated in the accompanying drawing in which:

Figure 1:
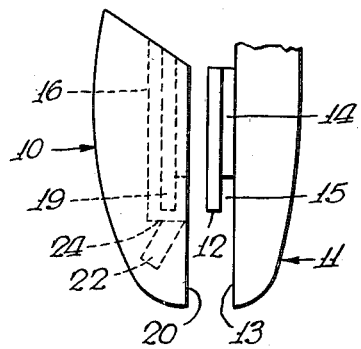
Fig. 1 is an exploded side elevational view of a form of my dental facing, together with a metal support or backing upon which the facing is intended to be mounted.

In Fig. 1 of the drawing, I have illustrated a facing 10 employing my invention, and a conventional metal support or backing 11 having a longitudinally positioned rod-like key 12 extending from the surface 13 secured thereto by means of a web-section 14 having a thickness of web less than the width of the key. Additional retention for the facing is provided by extending the key 13 below the bottom edge of the web, which protrusion incissally over the web portion creates the niche 15.

The facing 10, made of plastic material, has a built-in reinforcement including a metal keyway 16 which is completely embedded in said material but for a surface of a wall having an upper opening 17 and a longitudinal slot 18 for inserting therein the key 12 and web 14, respectively. The opening 17 leads to a recess or bore 19 forming a seat for engagement with the key. The dorsal surface 20 of the facing 10 and the surface 13 of the backing 11 are thus provided with interengageable formations 16 and 12, whereby said surfaces are applied against each other when the facing is mounted on said backing or support.

Figure 2:
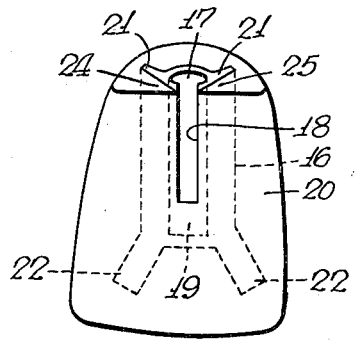
Fig. 2 is a rear elevation of the dental facing.

The reinforcement forming metal keyway 16 is further provided with lateral extensions 21 for obtaining better anchorage and lower spaced apart diverging extensions 22 extending from the aforesaid wall of said reinforcement into the body of said facing in an incisal and labial direction, into the plastic body 10 but short of the lower edge thereof, as shown in Figs. 1 and 2, to form stress absorbing means taking up the mastical stresses, and to reinforce but nevertheless preserve the translucency of the incisal edge of the plastic facing.

Flanching undercuts 24 and 25 are additionally provided to further secure the plastic body to the metal reenforcement.

Figure 3:
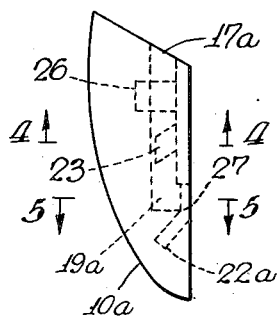
Fig. 3 is a side elevation of a modification thereof.
Figure 4:
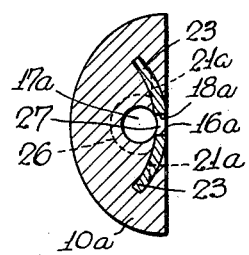
Fig. 4 is a sectional view of the facing of Fig. 3 taken through the plane 4—4.
Figure 5:
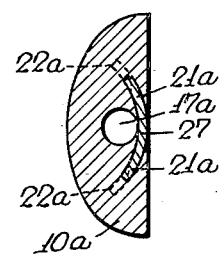
Fig. 5 is a similar view taken through the plane 5—5.

In Figs. 3, 4 and 5 is illustrated a modification of the device as shown, wherein the facing 10a is provided with an opening 17a for allowing the key to be inserted therein. Below the opening, the metal reinforcement 16a comprises the longitudinally extending wing sections 21a which are transversely connected by a reinforcing section 26 encircling the opening 17a. Underneath the slot 18a the lower portions of the wing sections merge into a reinforcing section 27 provided with incisal and labial extending extensions 22a similar to those described aforesaid. Intermedial laterally extending retention members 23 may also be provided for anchoring the plastic body to the reinforcement 16a.

Figure 6:
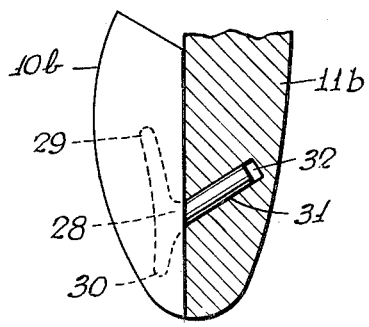
Fig. 6 is a side elevation, partly in section of a further modification secured to a metal backing.

In Fig. 6, a facing 10b is shown having a metal reinforcement 28 provided with anchoring sections 29 and lower extending reinforcements 30. The reinforcement 28 terminates in a pair of upwardly extending parallel pins 31 which are inserted in correspondingly positioned and dimensioned recesses 32 in the backing 11b.

Figures 7, 8, 9:
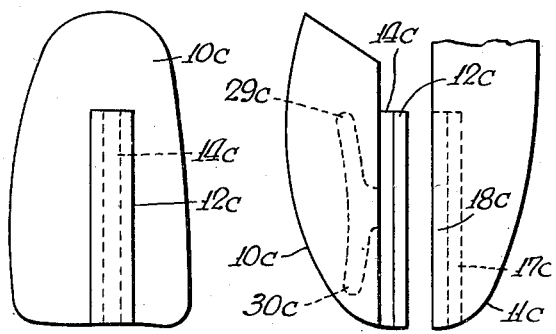
Fig. 7 is a rear elevation of still another modification.
Fig. 8 is a side elevation thereof.
Fig. 9 is a side elevation of the backing for the modification illustrated in Figs. 7 and 8.

A further modification, wherein the key and keyway are reversibly mounted, enabling the facing to be provided with the key, is shown in Figs. 7 and 8. In these figures, from the facing 10c projects the key 12c longitudinally positioned on web 14c, and imbedded in the facing is the integral metal reinforcement having upper projections 29c, and lower extending projections 30c. The key way, opening 17c, and slot 18c are provided in the metal backing 11c, and the key is slideably inserted therein to lock the facing to the backing, the adjacent faces being cemented together.

In all the facing modifications there are provided various interengageable formations for securing the facing to the backing, one of said formations being completely imbedded within and reinforcing the plastic body to enable the plastic facing to absorb the mastical stresses striking the plastic body, and to transmit the stresses through the interengageable formations to the dental backing.

Thus proper anchorage and reinforcement is obtained resulting in a facing that will give maximum service and freedom from continuous replacement.

The invention is particularly suitable when employed with plastic facings of the methyl methacrylate type which plastic has the necessary flexural strength, and is otherwise highly desirable for dental purposes.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities, coming within the scope of the appended claims, and by means of which, objects of my invention are attained and new results accomplished, as it is obvious that the particular embodiments herein shown and described are only some of the many that can be employed to attain these objects and accomplish these results.

It can thus be seen that there has been provided according to the invention a dental facing 10 with a translucent incisal edge portion and a surface 20 to be applied to a support 11, said facing and said support having interengageable formations 12, 16, the formation 16 of the facing comprising an elongated reinforcement 16 provided with a wall at 18, said reinforcement being smaller in area than that of said surface of said facing and being completely embedded in said facing but for a surface of said wall, a seat 19 provided in said reinforcement for receiving an end of said formation of said support, and laterally and incisally projecting stress absorbing means 22 forming parts of said reinforcement 16 and extending from said wall into said facing 10 and terminating short of the incisal edge of said facing, whereby stresses imparted to the incisal edge of said facing are transmitted to said absorbing means and thence to said support.

Having thus described the invention, what is claimed as new and desired to be secured by Letters Patent is:

1. In a dental structure having a dental facing with a translucent incisal edge portion and a support therefor, said facing and said support having contiguous surfaces with interengageable formations whereby said facing is applied to said support; the formation of said facing comprising an elongated reinforcement provided with a wall, said reinforcement being smaller in area than that of said surface of said facing and being completely embedded in said facing but for a surface of said wall, a seat provided in said reinforcement for receiving said formation of said support, and laterally and incisally projecting stress absorbing means forming part of said reinforcement and extending from said wall into said facing and terminating short of the incisal edge of said facing, whereby the translucency of the incisal edge of said reinforced facing is substantially maintained and stresses imparted to said edge are transmitted to said absorbing means and thence to said support.

2. A dental facing, having a surface to be applied to a support having a metallic plate with a key offset on said plate, comprising an elongated metallic reinforcement provided with a wall, said reinforcement being completely embedded in said facing but for a surface of said wall which is centrally disposed with respect to said surface of said facing, said wall being shaped for interlock with said key, a seat in said reinforcement for engagement by an end of said key, and spaced apart laterally and incisally extending anchoring means forming part of said reinforcement and projecting from said wall into said facing, said anchoring means terminating short of the incisal edge of said facing, whereby said key when the end thereof is engaged with said seat, properly positions the facing with respect to said support.

BRUNO KAUFMANN.

REFERENCES CITED

The following references are of record in the file of this patent:

UNITED STATES PATENTS

| Number | Name | Date |
|---|---|---|
| 897,518 | Bloom | Sept. 1, 1908 |
| 1,310,237 | Goldberg | July 15, 1919 |
| 2,147,403 | Freedman | Feb. 14, 1939 |
| 2,420,570 | Shapiro | May 13, 1947 |